Patented Aug. 25, 1953

2,650,225

UNITED STATES PATENT OFFICE 2,650,225

MANUFACTURE OF MESO-HALOGENO-AZA-ACRIDINES

Alan August Goldberg, Hampstead, London, and Donald Maurice Besly, Wells, England, assignors to Ward Blenkinsop & Company Limited, London, England, a British company No Drawing. Application May 14, 1951, Serial No. 226,274. In Great Britain May 17, 1950

16 Claims. (Cl. 260—288)

The invention relates to the manufacture of meso halogeno aza-acridines (pyridoquinolines) represented by the formula

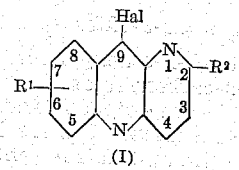

(I)

in which $R^1$ is a hydrogen or a halogen atom or and alkoxy or nitro group and $R^2$ is an alkoxy or aryloxy group.

It has been found that ortho-pyrid-(3)-ylamino benzoic acids (3'-aza-diphenylamine-2-carboxylic acids) described in our British application No. 11,027/50 (now British Patent No. 696,127) of the general formula

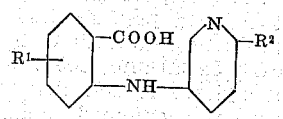

wherein $R^1$ and $R^2$ are as above defined can be treated with a phosphoryl halide whereupon simultaneous cyclisation and halogenation takes place with formation of the corresponding meso-halogeno aza-acridine.

Cyclisation occurs exclusively on to the position ortho to the heterocyclic nitrogen of the pyridine ring, i. e. the compounds obtained according to the invention are derivatives of 1-aza-acridine. Well defined crystalline compounds have been obtained.

According to the invention the new compounds are also obtained by the cyclodehydration of the appropriately substituted 3'-aza-diphenylamine-2-carboxylic acid by methods which are known to effect the cyclodehydration of diphenylamine-2-carboxylic acids to acridones and the isolation of the resulting substituted 1- or 3-aza-acridone thus produced; the latter are then converted into the meso-halogeno 1-aza acridines by treatment with a phosphoryl halide. Known reagents for effecting cyclodehydration of diphenylamine-2-carboxylic acids are sulphuric acid, mixtures of sulphuric acid and phosphoric acid and boron trioxide, mixtures of sulphuric acid and acetic anhydride, mixtures of acetic anhydride and acetyl chloride; a further known method for converting diphenylamine-2-carboxylic acids to acridones consists in preparing the diphenylamine-2-carboxyl chloride and effecting cyclisation by addition of aluminum chloride or stannic chloride.

It was not to be expected from an examination of the prior art that substituted 3'-aza-diphenylamine-2-carboxylic acids of the above structure could be converted into meso-halogeno aza-acridines. For examples, Kermack and Weatherhead (J. Chem. Soc., 1942, 726), Petrow (J. Chem. Soc., 1945, 927) and Bachman and Barker (J. Org. Chem., 1949, volume 14, 97) all state that it was found impossible to cyclise 3'-aza-diphenylamine-2-carboxylic acid and 4'-aza-diphenylamine-2-carboxylic acid. Moreover, Bachman and Barker (loc. cit.) state that although they effected cyclisation of 3:5 - dimethyl - 4-aza-diphenylamine-2-carboxylic acid to give 1:3-dimethyl-2-aza-acridone it was impossible to convert this into the "desired" meso-halogeno aza-acridine.

A preferred process for the manufacture of meso-halogeno-aza-acridines comprises heating the appropriately substituted ortho-(pyrid-3-ylamino) benzoic acid, or the corresponding aza-acridone derived therefrom by cyclisation, with phosphoryl chloride; the said ortho-pyridyl aminobenzoic acid may have as a nuclear substituent in the ring carrying the carboxyl group, a halogen atom (for example, chlorine or bromine) or an alkoxy or nitro group whilst the pyridyl ring has as a nuclear substituent an alkoxy, or aryloxy group in the position para to the —NH-bridge. The nuclear substituent in the ring carrying the carboxyl group is preferably present in the 4- or 5-position.

It is preferred to effect the cyclisation by refluxing the ortho-pyridylaminobenzoic acid directly with an excess of phosphoryl chloride, distilling off any excess of the latter under reduced pressure, quenching the residue on ice and adding ammonia and ice to release the meso-halogeno-aza-acridine base.

An alternative method of cyclisation of the ortho-pyridylaminobenzoic acid is to heat it with sulphuric and/or phosphoric acid or with a mixture of sulphuric acid and acetic anhydride. This results in formation of a 1-aza-acridone and the latter may then be converted into the corresponding meso-halogeno aza-acridine by refluxing with a phosphoryl oxyhalide and the reaction mixture treated as described above.

Suitable starting materials for the production of the aza-acridines of the invention are the 5 - halogeno - 4' - alkoxy - 3'-aza-diphenylamine 2-carboxylic acids, the 5-halogeno-4'-aryloxy-3'-aza-diphenylamine 2-carboxylic acids, the 4'-alkoxy-4- and -5-nitro-3'-aza-diphenylamine 2-carboxylic acids and the 4.4-dialkoxy-3'-aza-diphenylamine 2-carboxylic acids. Preferably the alkoxy group is a lower alkoxy group such as methoxy, ethoxy, a propoxy, a butoxy, a pentoxy or hexoxy group. The aryloxy group is preferably a low molecular weight aryloxy group such as phenoxy, tolyloxy or xylyloxy and the preferred halogens are chlorine and bromine.

Compounds which can be thus obtained include, 2-methoxy-6:9-dichloro-1 - aza - acridine, 2-ethoxy-6:9-dichloro-1 - aza - acridine, 2 - propoxy-6:9-dichloro-1-aza-acridine, 2 - n - butoxy-6:9-dichloro-aza-acridine, 2-phenoxy-6:9-dichloro-1-aza-acridine, 2 - ethoxy-6-nitro-9-chloro-1-aza-acridine, 2-methoxy-7-nitro-9-chloro-1-aza-acridine, and 2:7 - dimethoxy - 9 - chloro-1-aza-acridine.

Some of the products thus obtained are valuable intermediates for manufacturing compounds with antibacterial, antiplasmodial and antiprotozoal activity. They have pharmacological value.

The following examples, in which all parts of solids are by weight and all parts of liquids are by volume in units of the c. g. s. system, illustrate the manner in which the invention may be carried into effect:

EXAMPLE 1

2-n-butoxy-6:9-dichloro-1-aza-acridine 5-chloro-4'-n-butoxy-3'-aza - diphenylamine-2-carboxylic acid (12.8 parts) is refluxed with phosphorus oxychloride (128 parts) for 4 hours. Approximately two-thirds of the phosphorus oxychloride is removed by distillation in vacuo, and the residue then poured on crushed ice, and scratched until it becomes solid and friable. The solid is filtered off, suspended in water which has been made alkaline by addition of a few drops of ammonia and stirred for a short time.

The product, which is light yellow in colour, is filtered off and dried over sulphuric acid in vacuo. The yield is 12.8 parts (theoretical yield) and the product has a melting point of 121–124° C.

One crystallization from acetone raises the melting point to 127–128° C. (Found (on twice crystallised material of this melting point): N, 8.9%; Cl, 22.0%. $C_{16}H_{14}ON_2Cl_2$ requires: N, 8.7%; Cl, 22.1%).

EXAMPLE 2

2-methoxy-6:9-dichloro-1-aza-acridine 5-chloro-4'-methoxy-3'-aza - diphenylamine-2-carboxylic acid (5.4 parts) is refluxed with phosphorus oxychloride (54 parts) for 4 hours. Two-thirds of the phosphorus oxychloride is removed by distillation in vacuo, and the residue is then poured onto crushed ice, and scratched until it becomes solid and friable. The solid is filtered off, suspended in water, made alkaline by addition of a few drops of ammonia and stirred.

The light-yellow product is filtered off and dried over sulphuric acid in vacuo. It has a melting point of 181–184° C. (incomplete) and amounts to 5.3 parts which represents a yield of 98% theory.

The compound crystallises from acetone and has a melting point of 186–187° C. (Found: N, 10.4%; Cl, 24.9%. $C_{13}H_8ON_2Cl_2$ requires: N, 10.0%; Cl, 25.4%.)

EXAMPLE 3

2-phenoxy-6:9-dichloro-1-aza-acridine 25 parts of 4'-phenoxy-5-chloro - 3' - aza-diphenylamine-2-carboxylic acid are refluxed with 150 parts of phosphorus oxychloride for 5 hours. About one-half or two-thirds of the phosphorus oxychloride is distilled off under reduced pressure and the residue slowly poured into a stirred mixture of 3000 parts of crushed ice and 1000 parts of ammonia (D., 0.880). The product is collected, washed and dried over sulphuric acid in vacuo; the yield is 25 parts M. P. 174° C. Recrystallisation from a large volume of ligroin (B. P. 80/100°) gives the pure compound as an almost colourless microcrystalline powder M. P. 184° C. It is very soluble in hot chloroform. (Found: N, 8.2; Cl, 20.5 $C_{18}H_{10}ON_2Cl_2$ requires: N, 8.2; Cl, 20.8%.)

EXAMPLE 4

2-methoxy-7-nitro-9-chloro-1-aza-acridine 15 parts of 4'-methoxy-4 - nitro - 3' - aza - diphenylamine-2-carboxylic acid are refluxed for 4 hours with 150 parts of phosphorus oxychloride. The crude product, isolated as described in Example 3 is obtained as an orange powder (14 parts). The pure compound, obtained by recrystallisation from carbon tetrachloride in the form of yellow needles, has M. P. 250° C. (Found: N, 14.9; Cl, 12.9. $C_{13}H_8O_3N_3Cl$ requires: N, 14.5; Cl, 12.3%.)

EXAMPLE 5

2-ethoxy-6-nitro-9-chloro-1-aza-acridine

By substituting 4'-ethoxy-5-nitro-3' - aza - diphenylamine-2-carboxylic acid for the 4'-methoxy-4-nitro - 3' - aza - diphenylamine - 2 - carboxylic acid in Example 3 there is obtained in like manner 2-ethoxy-6-nitro-9-chloro - 1 - aza-acridine in high yield.

EXAMPLE 6

2:7-dimethoxy-9-choloro-1-aza-acridine 50 parts of 4:4'-dimethoxy-3'-aza-diphenylamine-2-carboxylic acid are refluxed for 4 hours with 300 parts of phosphorus oxychloride. About one-half of the phosphorus oxychloride is distilled off at reduced pressure and the residue poured with stirring into a mixture of 800 parts of ammonia (D., 0.880) and 3000 parts of crushed ice. The precipitate is collected, washed and dried in vacuo over sulphuric acid. The yield is 50 parts M. P. 212–214° C. The pure compound, obtained by recrystallisation from a large volume of ligroin (B. P. 80/100°), has M. P. 218–220°. (Found: N, 10.4; Cl, 13.2. $C_{14}H_{11}O_2N_2Cl$ requires: N, 10.2; Cl, 12.9%.)

EXAMPLE 7

2:7-dimethoxy-9-choloro-1-aza-acridine

A solution of 50 parts of 4:4'-dimethoxy-3'-aza-diphenylamine-2-carboxylic acid in 500 parts of sulphuric acid is heated on the water-bath for 1 hour and poured on to ice. The precipitate of 2:7-dimethoxy-1-aza-acridone is collected and crystallised from alcoholic pyridine; the product is obtained in yellow crystals M. P. above 300° C. (Found: N, 10.9. $C_{14}H_{12}O_3N_2$ requires: N, 10.9%.) 50 parts of 2:7-dimethoxy-1-aza-acridone are refluxed for 4 hours with 400 parts of phosphorus oxychloride. By isolating the product in the same manner as described in Example 6 there is obtained a good yield of 2:7-dimethoxy-9-chloro-1-aza-acridine.

What we claim is:

1. A meso halogeno-1-aza-acridine having the general formula

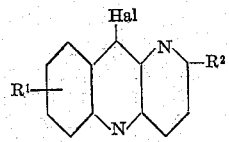

in which $R^1$ is selected from the group consisting of hydrogen, halogen, lower alkoxy and nitro and $R^2$ is selected from the group consisting of lower alkoxy and aryloxy groups and Hal is a halogen atom.

2. A meso halogeno 1-aza-acridine having the general formula

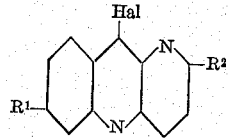

in which $R^1$ is selected from the group consisting of hydrogen halogen, lower alkoxy and nitro and $R^2$ is selected from the group consisting of lower alkoxy and aryloxy groups and Hal is a halogen atom.

3. A meso halogeno 1-aza-acridine having the general formula

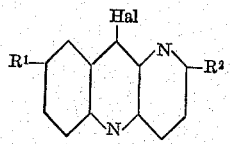

in which $R^1$ is selected from the group consisting of hydrogen, halogen, lower alkoxy and nitro and $R^2$ is selected from the group consisting of lower alkoxy and aryloxy groups and Hal is a halogen atom.

4. 2-n-butoxy-6,9-dichloro-1-aza-acridine.
5. 2-methoxy-6,9-dichloro-1-aza-acridine.
6. 2-phenoxy-6,9-dichloro-1-aza-acridine.
7. 2 - methoxy - 7 - nitro - 9 - chloro - 1- aza-acridine.
8. 2-ethoxy-6-nitro-9-chloro-1-aza-acridine.

9. A method of producing a meso-halogeno-1-aza-acridine having the general formula

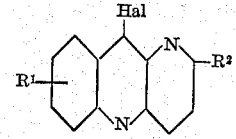

in which $R^1$ is selected from the group consisting of hydrogen, halogen, lower alkoxy and nitro and $R^2$ is selected from the group consisting of lower alkoxy and aryloxy groups and Hal is a halogen atom which comprises treating an ortho-pyrid-(3-yl)-aminobenzoic acid having the general formula

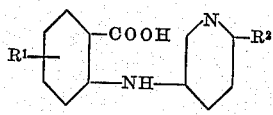

in which $R^1$ and $R^2$ are as above defined with a phosphoryl halide and isolating the product.

10. A method of producing a meso-halogeno-1-aza-acridine having the general formula

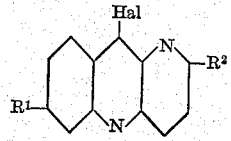

in which $R^1$ is selected from the group consisting of hydrogen, halogen, lower alkoxy and nitro and $R^2$ is selected from the group consisting of lower alkoxy and aryloxy groups and Hal is a halogen atom which comprises treating an ortho-pyrid-(3-yl)-aminobenzoic acid having the general formula

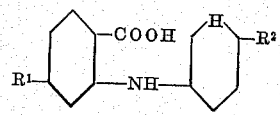

in which $R^1$ and $R^2$ are as above defined with a phosphoryl halide and isolating the product.

11. The method according to claim 10 in which said ortho-pyrid-(3-yl)-aminobenzoic acid is 5-chloro - 4$^1$ - methoxy - 3$^1$ - aza - diphenylamine-2-carboxylic acid.

12. The method according to claim 10 in which said ortho-pyrid-(3-yl)-aminobenzoic acid is 5-chloro - 4$^1$ - n - butoxy - 3$^1$ - aza - diphenylamine-2-carboxylic acid.

13. The method according to claim 10 in which said ortho-pyrid-(3-yl)-aminobenzoic acid is 5-chloro - 4$^1$ - phenoxy - 3$^1$ - aza - diphenylamine-2-carboxylic acid.

14. The method according to claim 10 in which said ortho-pyrid-(3-yl)-aminobenzoic acid is 5-nitro - 4$^1$ - ethoxy - 3$^1$ - aza - diphenylamine-2-carboxylic acid.

15. A method of producing a meso-halogeno-1-aza-acridine having the general formula

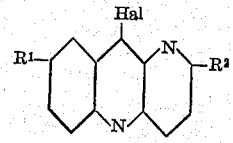

in which $R^1$ is selected from the group consisting of hydrogen, halogen, lower alkoxy and nitro and $R^2$ is selected from the group consisting of lower alkoxy and aryloxy groups and Hal is a halogen atom which comprises treating an ortho-pyrid-(3-yl)-aminobenzoic acid having the general formula

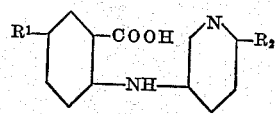

in which $R^1$ and $R^2$ are as above defined with a phosphoryl halide and isolating the product.

16. The method according to claim 15 in which said ortho-pyrid-(3-yl)-aminobenzoic acid is 4-nitro - 4$^1$ - methoxy - 3$^1$ - aza - diphenylamine-2-carboxylic acid.

ALAN AUGUST GOLDBERG.
DONALD MAURICE BESLY.

References Cited in the file of this patent

Bachman et al.: J. Org. Chem., vol. 14, pp. 97–104 (1949).

Fieser et al.: "Organic Chemistry" (D. C. Health and Co.; Boston 1944), page 32.